United States Patent [19]
Mastroianni

[11] 3,910,350
[45] Oct. 7, 1975

[54] HYDROCARBON RECOVERY IN WATERFLOODING
[75] Inventor: Martin J. Mastroianni, Buffalo, N.Y.
[73] Assignee: Phillips Petroleum Company, Bartlesville, Okla.
[22] Filed: May 16, 1974
[21] Appl. No.: 470,585

[52] U.S. Cl. ................................................ 166/274
[51] Int. Cl.² ........................................ E21B 43/22
[58] Field of Search ........... 166/273, 274, 275, 294, 166/305 R

[56] References Cited
UNITED STATES PATENTS

| | | | |
|---|---|---|---|
| 2,272,673 | 2/1942 | Kennedy | 166/273 |
| 2,876,840 | 3/1959 | Berry, Jr. | 166/294 |
| 2,896,716 | 7/1959 | Spurlock | 166/294 |
| 3,084,744 | 4/1963 | Dew et al. | 166/274 X |
| 3,093,192 | 6/1963 | Allen | 166/294 |
| 3,180,415 | 4/1965 | Allen | 166/294 |

Primary Examiner—Stephen J. Novosad

[57] ABSTRACT

The introduction of a solution of asphalt in a solvent into water-wet formations increases markedly the quantity of oil produced in a waterflooding step.

8 Claims, No Drawings

HYDROCARBON RECOVERY IN WATERFLOODING

This invention relates to the art of recovery of hydrocarbons from formations.

More specifically, this invention relates to the recovery of hydrocarbons after the hydrocarbon-bearing formations have become substantially devoid of natural fluid energy.

BACKGROUND OF THE INVENTION

In the art of secondary recovery of hydrocarbons, especially oil, one of the most widely accepted techniques is the method of waterflooding of the formation. This method has found widespread application because of its economy and effectiveness. For recovery of oil which is not forced out into well bores by natural pressure, water is introduced under pressure into at least one oil well so as to permit the water to force the oil through the formation and into the recovery oil well into which no water is being introduced.

Although waterflooding has obvious advantages in comparison with other methods of secondary recovery, a considerable quantity of oil remains in the formation after such a recovery operation. Several reasons for this can be given. Many attempts have been made to solve this problem of removal of remaining oil in the formation so as to thereby increase the oil recovered by secondary waterflooding operations. However, in the art of oil production there still exists the desirability for effecting removal of the residual oil remaining after conventional waterflooding.

THE INVENTION

Accordingly, it is an object of the present invention to provide an improved process for hydrocarbon recovery from a hydrocarbon-bearing formation.

Another object of this invention is to provide a method for increasing the recovery of residual oil from a previously produced oil-bearing formation.

Other aspects, objects, features and advantages of the present invention will become apparent from the following detailed description of the invention and the appended claims.

In accordance with the present invention, I have now discovered that by treating a hydrocarbon-bearing formation with a solution of asphalt in a hydrocarbon solvent following primary production of the formation, there can be substantially increased the amount of hydrocarbon otherwise recoverable therefrom.

More specifically, I have now discovered that treating a previously produced oil-bearing formation with a solution of an asphalt in a hydrocarbon solvent prior to commencing waterflooding thereof will result in an increase in the amount of oil otherwise producible from the formation.

All asphalts can be used for the purposes of this invention. Preferred are asphalts having a penetration from 60 to 150, the 85-100 penetration grade asphalt being especially useful. The penetration is measured in accordance with ASTM Method D-5 operating for 5 seconds at 77° F with a 100 g load.

Basically, any solvents for asphalt can be used in accordance with this invention. However, a presently preferred group of solvents are those of the group consisting of carbon tetrachloride, carbon bisulfide, trichloroethylene, hydrocarbons with 3 to 20 carbon atoms per molecule, especially hexadecane, and mixtures of hydrocarbons, especially distillate cuts of petroleum having initial boiling points of about 240° to 400° F and distillation end points of about 300° to about 750° F.

The asphalt solution actually introduced into the formation should be a solution, i.e., the liquid should be essentially free of undissolved solids. Preferably the asphalt solution is filtered before the introduction thereof into the formation.

The driving fluids used in accordance with this invention can be selected from the fluids conventionally used to drive hydrocarbons towards a production well in a formation which is depleted of natural driving forces. Thus, gaseous driving fluids are useful, however, aqueous fluids are preferred. The water used can contain many additional ingredients. Frequently, the water used is a brine containing 5,000 to 50,000 parts by weight salt per 1,000,000 parts by weight of water dissolved therein. The aqueous fluid also can comprise surfactants, polymers, gel polymers or other thickening material.

The operating conditions as to temperature and pressure are not critical for this invention. It is, however, preferred to operate under normal conditions; that means that fluids introduced into the wells have surrounding or surface temperatures. The pressure used must be high enough to overcome the pressure in the formation; on the other hand, the pressure must not exceed a value where the formation starts to crack. In Oklahoma, for instance, the pressure increase is about ½ psi per foot depth so that the pressure for injecting the fluids into a formation 3,000 feet deep would have to exceed 1,500 psi. The upper limit for the pressure is the pressure at which there are breaks or cracks. This so-called fracturing pressure is for the Burbank field 4,500 psi. The temperature of the fluids injected is preferably the surface temperature, i.e., a temperature usually well below the temperature of the reservoir.

The time during which the formation is contacted with the asphalt solution depends both on the quantity of asphalt solution introduced into the formation and the velocity with which this solution moves through the rock. It is presently preferred that the time during which the formation is contacted with the asphalt solution is between about one and about 5 days.

The quantity of asphalt solution introduced into the formation usually will be about 1 to about 50 percent of the pore volume; preferably this quantity would be in the range of about 10 to about 20 percent of the pore volume.

The hydrocarbon recovery from wells in which the natural pressure forces the hydrocarbon into the well is called "primary recovery", whereas "secondary recovery" means the hydrocarbon recovery by forcing the hydrocarbons into a well hole by extraneous means, e.g. by waterflooding for the first time, regardless of whether or not primary recovery has proceeded, and "tertiary recovery" means hydrocarbon recovery from wells after a secondary recovery.

The property "water-wet" as used herein means a property of the formation characterizing the wettability of the formation rock by the formation oil and by the water involved.

The property water-wet can be defined by the contact angle of a droplet of water sitting on the surface of the rock and being surrounded by the formation oil. If said water droplet surface forms an angle of 0° to 90° (angle of tangent) with the solid surface, the formation is called water-wet.

To determine whether or not a formation is water-wet in the meaning given above, the following procedure basically is employed which is a modified Amott method (Earl Amott, "Observations Relating to the Wettability of Porous Rock", Trans., AIME Vol. 216, 1959). In this method a fresh core sample taken from the respective formation covered with water is centrifuged, then washed with water. Then the probe is covered with formation oil and is again centrifuged, rinsed with oil, blotted and weighed (the weight is supposed to be A). Then the probe is submerged in water for 24 hours, rinsed with water, blotted and weighed (the result is supposed to be B). Thereafter, the probe is again centrifuged under water, blotted and weighed (the result is supposed to be C). Then the probe is submerged in the formation oil for 24 hours, washed with formation oil, blotted and weighed (the result is supposed to be D). Thereafter, the probe is centrifuged in the formation oil, washed with formation oil, blotted and weighed (the weight is supposed to be E). In the end, E should be about equal to A. The centrifuging steps should be carried out for one hour at 33,000 g. If the water-by-oil displacement ratio (B-A/C-A) is greater than the oil-by-water displacement ratio (C-D/C-E) the formation (system) is called water-wet, otherwise it is called oil-wet.

The invention will be more fully understood in light of the following examples. In these examples, laboratory experiments are described which have been carried out in order to simulate actual formation conditions as closely as possible.

EXAMPLE I

Preparation of core samples

A series of samples of Berea sandstone having cylindrical shape and being three inches long and one inch in diameter was sealed at the cylindrical circumference with an epoxy resin so that gas and liquids could only move in an axial direction through the core. The cores were then put into a vacuum chamber in order to take out any gas in the pores. Then a synthetic brine containing 910 ppm sodium chloride, 239 ppm calcium chloride and 109 ppm magnesium chloride was introduced into this core until the core was saturated with this so-called 1200 ppm brine. The cores were then flooded with n-hexadecane. The liquids used were forced through the core by means of a masterflex constant rate pump at a rate of 12 cubic centimeters per hour.

The result of this experiment are Berea sandstone cores being saturated with n-hexadecane and containing a quantity of brine called the irreducible water saturation. The resulting cores are a relatively close simulation of a naturally occurring oil-bearing formation after primary recovery.

EXAMPLE II

Recovery of hexadecane from Berea sandstone cores

Through a portion of the cores prepared in accordance with Example I 1200 ppm brine with the equipment as described in Example I was pumped. This simulates relatively closely the waterflooding carried out after the primary recovery has ended.

The residual oil saturation after this waterflooding was measured. This residual oil saturation ($S_{or}$) is defined as that percentage of the total pore volume which is still filled with oil after the respective flooding step. The total pore volume is measured by weighing the core before saturating it with brine and afterwards. From the weight of the brine in the core and the density thereof the pore volume is calculated. The residual oil saturation is measured by measuring the quantity of oil introduced into the core in accordance with Example I and by measuring the quantity of oil which is recovered by the waterflooding steps in accordance with this example. From the difference the volume of the oil still in the rock can be calculated and this volume constitutes a percentage of the total pore volume. This percentage is called the residual oil saturation.

The results of this example are contained in Table I in the column having the heading $S_{or}$ and illustrates recovery of hexadecane from Berea sandstone core.

EXAMPLE III

The effect of an asphalt solution on the oil recovery

After the waterflooding step of Example II the core was again saturated with hexadecane simulating the oil. However, this time the hexadecane was first thoroughly mixed with one percent of asphalt. The asphalt used was 85–100 penetration asphalt produced by the Phillips Petroleum Company at its refinery in Woods Cross, Utah. The asphalt solution was filtered through a coarse, and then through a 0.45 micron, millipore filter. A substantial undetermined residual was obtained. It is assumed that the residual comprises the asphaltenes and that polar resins and oil were dissolved in the hexadecane.

The asphalt solution thus prepared was introduced into the core. Then the solution in the core was allowed to equilibrate for a certain period of time shown in Table I. Thereafter the core was again waterflooded with the 1200 ppm brine mentioned in Example I. The residual oil saturation was measured as described in Example II. The results are shown in Table I.

TABLE I

RESULTS OF WATERFLOODING BEREA CORES SATURATED WITH
1 WEIGHT PERCENT SOLUTIONS OF WOODS CROSS ASPHALT IN HEXADECANE

| Run No. | Core | $S_{or}{}^{(a)}$ % PV | Time$^{(b)}$, Hours | Increased Oil Recovery | | | |
|---|---|---|---|---|---|---|---|
| | | | | Total, %PV | Increase, % | Surface$^{(c)}$ % PV | Interfacial$^{(d)}$ % PV |
| 1 | 130 | 44 | 0.2 | 10 | 23 | 6 | 4 |
| 2 | 129 | 41 | 1.5 | 4 | 10 | 1 | 3 |
| 3 | 132 | 50 | 1.5 | 15 | 30 | 12 | 3 |
| 4 | 132 | 50 | 18.5 | 22 | 44 | — | — |
| 5 | 129 | 41 | 21 | 4 | 10 | — | — |
| 6 | 127 | 48 | 43 | 2 | 4 | — | — |
| 7 | 130 | 44 | 50 | 14 | 32 | — | — |
| 8 | 129 | 41 | 189 | 15 | 37 | 6 | 9 |
| 9 | 129 | 41 | 189 | 14 | 34 | 7 | 7 |
| 10 | 132 | 50 | 465 | 27 | 54 | 24 | 3 |

TABLE I — Continued

RESULTS OF WATERFLOODING BEREA CORES SATURATED WITH
1 WEIGHT PERCENT SOLUTIONS OF WOODS CROSS ASPHALT IN HEXADECANE

| Run No. | Core | $S_{or}$[a]5 % PV | Time[b], Hours | Increased Oil Recovery Total, %PV | Increase, % | Surface[c] % PV | Interfacial[d] % PV |
|---|---|---|---|---|---|---|---|
| 11 | 132 | 50 | 465 | 26 | 52 | 23 | 3 |
| 12 | 130 | 44 | 554 | 24 | 55 | 19 | 5 |
| 13 | 130 | 44 | 554 | 24 | 55 | 19 | 5 |

[a]Original waterflood residual hexadecane saturation before treatment with the asphalt solution
[b]Total shut-in time that the core was in contact with the asphalt solution
[c]That portion of the total attributed to wettability changes caused by the adsorption of asphalt on the core surface
[d]That portion of the total attributed to the concentration of asphalt at the oil-water interface The figures shown in Table I clearly show that the residual oil saturation is reduced considerably by using a solution of one weight percent asphalt in hexadecane instead of using pure hexadecane in these experiments simulating the water-flooding steps. The increase achieved is also shown percentage-wise in Table I, and it can be seen that for a residence time of 1.5 hours 10 percent of the residual oil as additional recovery is forced out of the rock and for a residence time of 189 hours 35 percent of the residual oil has been forced out of the cores by the waterflooding step.

EXAMPLE IV

Influence of the asphalt on the increase of the oil recovery resulting from an effect on the rock surface and resulting from an effect on the oil-water interface.

After the measuring of the reduced residual oil saturation in accordance with Example III hexadecane without asphalt was again introduced into the cores. For a third time the waterflooding was carried out as described with the 1200 ppm brine. The residual oil saturation was again measured. The residual oil saturation this time was between a saturation of the corresponding core in Example II (no asphalt present) and in Example III (asphalt present both on the rock and in the hexadecane). The increase in oil recovery for this example is believed to result solely from the effect that the asphalt being introduced during Example III has changed the rock surface. The increased oil recovery of this example as compared to Example II is shown in Table I in the column having the heading "Surface % P.V." The remaining percentage shown in the far right column of Table I is believed to be correlated to the effect of the asphalt at the interface between the hexadecane and the brine. This last column in Table I is calculated so that the sum of the volumes of the two columns equals each with the value of the total increase of oil recovery listed in Table I at the column having the heading "Total, % PV".

This example proves that the asphalt is effective to increase the oil recovery both by affecting the rock surface to make it release more oil and by affecting the interfacial conditions of brine and the solvent of the asphalt.

EXAMPLE V

Change of behavior of the mineral during oil recovery resulting from the treatment with asphalt.

A Berea sandstone core (No. 127) was prepared as described in Example I. This core was waterflooded as described in Example II. During this waterflooding step the water-to-oil ratio of the liquid leaving the core was measured. The results of this portion of the example are listed in the following Table II in the left portion.

Thereafter the same core was again flooded with the solution of one weight percent of asphalt in hexadecane as described in Example III. Thereafter the core was again water-flooded with the brine as described. During this waterflooding step the water-to-oil ratio was again measured as related to the volume of brine injected. The asphalt solution was kept in the core for 118 hours. The results are given in the right portion of the following Table II.

TABLE II

| Pore Volumes of brine being being injected | Water-to-oil ratio, hexadecane being displaced | Pore Volumes of brine being injected | Water-to-oil ratio, 1% asphalt solution being displaced |
|---|---|---|---|
| 0.35 | 9 | 0.5 | 9 |
| 0.6 | 20 | 2.15 | 50 |
| 1.4 | 1000 | 3.8 | 60 |
|  |  | 5.7 | 10,000 |

The above shown Table II shows that in the case of the untreated core, it had been exposed only to the pure hexadecane as the oil-simulating liquid, and very little hexadecane was obtained after breakthrough of water. On the other hand, in the case of the same core treated with hexadecane containing a small quantity of asphalt dissolved therein, the hexadecane solution was displaced over several volumes of brine injection. Therefore, it is assumed that the method of this invention changes the surface of the mineral or porous material from water-wet to oil-wet. All cores studied showed similar behavior and changes in the flooding characteristics after the asphalt solution was held quiescent in the core.

EXAMPLE VI

Asphalt dissolved in a distillate cut of petroleum.

A portion of the cores prepared in accordance with Example I were treated as described in connection with Examples II, III and IV; the one weight percent of Woods Cross asphalt, however, was dissolved in a distillate cut of petroleum instead of hexadecane. The cut used had the following characteristics.

| | |
|---|---|
| Initial Boiling Point: | 352° F |
| Density: | 0.8147 |
| API Gravity | 41 |
| Average Molecular weight | 199 |
| Pour point | −5° F |
| Distillation: | |
| 10% distilled out at | 408° F |
| 30% distilled out at | 453° F |
| 50% distilled out at | 485° F |
| 70% distilled out at | 517° F |
| 90% distilled out at | 560° F |
| End Point: | 595° F. |

The results of these different waterflooding steps are given in the following Table III.

part of which is believed to result from interfacial effects at the interface between water and oil.

TABLE III

RESULTS OF WATERFLOODING BEREA CORES SATURATED WITH 1 WEIGHT PERCENT SOLUTION OF WOODS CROSS ASPHALT IN A DISTILLATE CUT

| Run No. | Core | $S_{or}^{(a)}$ % PV | Time$^{(b)}$ Hours | Increased Oil Recovery | | | |
|---|---|---|---|---|---|---|---|
| | | | | Total % PV | Increase, % | Surface$^{(c)}$, % PV | Interfacial$^{(d)}$, % PV |
| 15 | 102 | 23 | 28 | 7 | 30 | — | — |
| 16 | 102 | 23 | 43 | 13 | 56 | 8 | 5 |
| 17 | 103 | 26 | 70 | 18 | 69 | 12 | 6 |
| 18 | 103 | 26 | 116 | 25 | 96 | 18 | 7 |
| 19 | 105 | 38 | 141 | 20 | 53 | 12 | 8 |

$^{(a), (b), (c), (d)}$The meaning of the column headings are the same as the meanings of the column headings of Table I.

From the data shown in Table III of this example it can clearly be seen that also a distillate cut serving as the solvent for the asphalt considerably increases the oil recovery in a waterflooding step.

EXAMPLE VII

Influence of change of asphalt concentration.

The operation described in Example VI was repeated using, however, three weight percent of 85–100 penetration asphalt described in Example III instead of one weight percent to prepare the solution to be injected. The shutin time of the asphalt solution was 192 hours. The results are given in the following Table IV.

TABLE IV

RESULTS OF WATERFLOODING BEREA CORES SATURATED WITH A 3 WEIGHT PERCENT SOLUTION OF ASPHALT IN A DISTILLATE CUT

| Run No. | Core | $S_{or}^{(a)}$ % PV | Time$^{(b)}$ Hours | Increased Oil Recovery | | | |
|---|---|---|---|---|---|---|---|
| | | | | Total, % PV | Increase, % | Surface$^{(c)}$, % PV | Interfacial$^{(d)}$, % PV |
| 20 | 200 | 38 | 192 | 11 | 27 | 4 | 7 |
| 21 | 204 | 27 | 192 | 11 | 41 | 3 | 8 |
| 22 | 206 | 41 | 192 | 21 | 51 | 13 | 8 |

$^{(a), (b), (c), (d)}$The meanings of column headings are the same as the meanings of the column headings of Table I.

The runs of this example show that by increasing the concentration of asphalt in the distillate cut from one to three percent, no corresponding increase in the recovered oil quantity could be found.

EXAMPLE VIII

In this example the interfacial tension of the oil-simulating liquids used has been measured. It was found that by mixing one weight percent of asphalt to the distillate cut described above, the oil-water interfacial tension was reduced from 40.3 to 26.7 ergs per square centimeter. 1 weight percent of asphalt mixed and partially dissolved in hexadecane decreased the oil-water interfacial tension from 40.3 to 24.2 ergs per square centimeter. Former surfactant flooding experiments have indicated that a reduction in the surface tension of this order of magnitude has no effect on the amount of oil recovered on waterflooding, which, then, is consistent with scientific work showing that the contact angle was held constant and the interfacial tension varied. Surprisingly, the examples given above have shown that the introduction of the lower percentage asphalt solution resulted in increased oil recovery, Reasonable variations and modifications, which will be apparent to those skilled in the art, can be made in this invention without departing from the spirit or scope thereof.

What is claimed is:

1. A process for recovering hydrocarbons from hydrocarbon-containing formations, comprising the steps
   a. injecting a solution of asphalt in a solvent into at least one injection well of a water-wet formation so as to change the formation from its water-wet to an oil-wet state; thereafter
   b. introducing an aqueous fluid into said formation so as to force at least a portion of the hydrocarbons into at least one production well; and
   c. recovering said hydrocarbons from said production well.

2. A process in accordance with claim 1 wherein said solution of asphalt in the solvent is introduced into at least one injection well before any further recovery step.

3. A process in accordance with claim 1 wherein said solution of asphalt contains less than about 10 parts by weight of asphalt.

4. A process in accordance with claim 3 wherein about 1 to about 3 weight percent of asphalt is thoroughly mixed with about 99 to 97 weight percent of a solvent and the liquid portion of the mixture is introduced into the injection well.

5. A process in accordance with claim 3 wherein said solution comprises a solvent selected from the group consisting of carbon tetrachloride, carbon bisulfide, trichloroethylene, hydrocarbons having 3 to 20 carbon atoms per molecule, mixtures of such hydrocarbons, distillate cuts of petroleum having an initial boiling point of about 240° to about 400° F and a distillation end point of about 300° to about 750° F.

6. A process in accordance with claim 1 wherein the solvent is selected from the group consisting of hydrocarbons having 3 to 20 carbon atoms per molecule and of distillate cuts having initial boiling points of about 240° to about 400° F and distillation end points in the range of about 300° F to about 750° F.

7. A process in accordance with claim 1 wherein the solvent is selected from the group consisting of distillate cuts having initial boiling points of about 350° F and distillation end points of about 600° F and aliphatic hydrocarbons having from 14 to 18 carbon atoms in the molecule.

8. A process in accordance with claim 1 wherein said solution of asphalt is introduced into the injection well before a secondary recovery step.

* * * * *